L. B. SMITH.
Wire Fence.
No. 66,182.
Patented June 25, 1867.
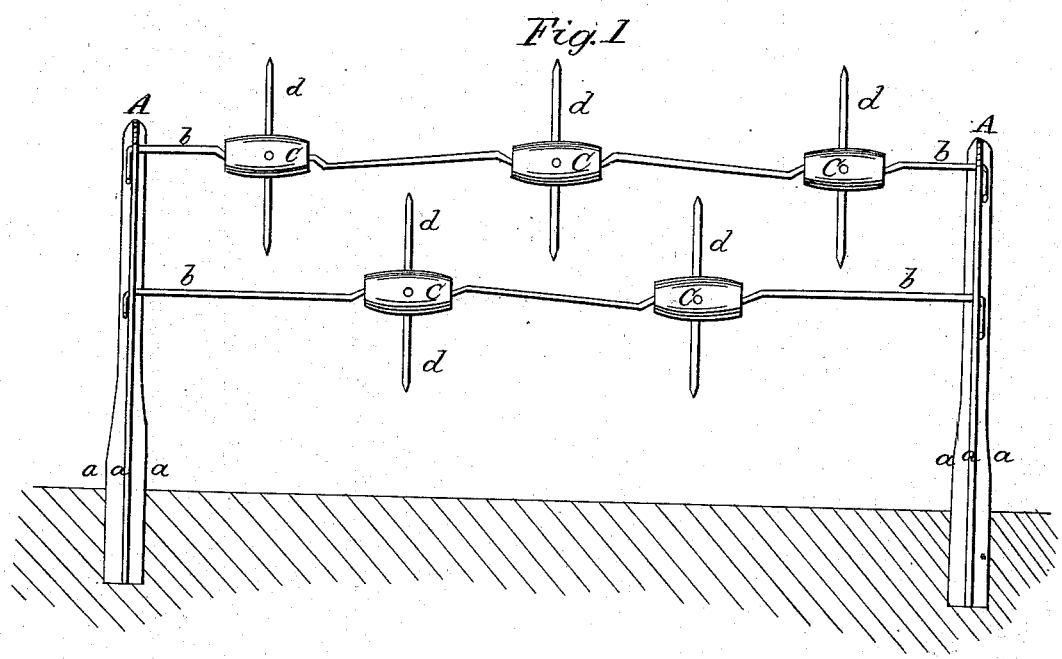

UNITED STATES PATENT OFFICE.

LUCIEN B. SMITH, OF KENT, OHIO.

WIRE FENCE.

Specification forming part of Letters Patent No. 66,182, dated June 25, 1867.

*To all whom it may concern:*

Be it known that I, LUCIEN B. SMITH, of Kent, in the county of Portage and State of Ohio, have invented a new and useful Improvement in Wire Fences; and I do hereby declare that the following is a full, clear, and exact description thereof, which will enable others skilled in the art to make and use the same, reference being had to the accompanying drawings, forming part of this specification, in which—

Figure 1 is a side view of a panel or length between two posts of my improved wire fence; Fig. 2, a cross-section of a post; Fig. 3, an end view of one of the protecting-spools detached.

Similar letters of reference indicate like parts.

This invention relates to an improvement in the construction of a wire fence especially adapted to use in the prairies of the Western States, where timber is scarce and fires frequently sweep over them, destroying everything that is combustible. This improvement consists in making the posts of cast-iron, between which two or more stout wires are strung tightly, which wires are provided with spools a few feet apart and protected with short projecting points, so arranged that they will turn around the wires, while they are held in place lengthwise of the wires, as hereinafter more particularly described.

A A represent cast iron posts, five feet or more in length and set in the ground about eighteen inches, or at a depth according to the nature of the earth to give them steadiness. The posts are made tapering from the bottom to the top, with four flanges, $a\ a$, radiating from a common center or in angle-iron form, to combine lightness with strength in the greatest degree and give the foot of the post the strongest hold in the ground that is possible.

Wires $b\ b$ are stretched from post to post, and fastened in any convenient manner at the ends to make them perfectly straight and parallel with the surface of the ground, as shown in Fig. 1. At a distance of two or three feet apart the wire is bent to form short straight lengths of about four inches, on which are hung strong spools $c\ c$, so that they can revolve loosely around the wire. The spools are provided with four short wire spurs or nails, $d\ d$, projecting radially from them. The spools may be made of cast-iron or wood. The whole should be painted with some good mineral paint, and if the spools are of wood they may be thus made measurably fire-proof.

A fence of this kind can be constructed very cheaply and will turn animals readily, as they can see it better than the ordinary wire fence, which has nothing attached to the wires to attract attention, and animals will not encounter the spurs or the spools. For the prairies it is particularly adapted, as it is both wind and fire proof.

Having described my invention, I claim as new and desire to secure by Letters Patent—

The construction of a wire fence provided with rotary spools $c\ c$, having radial spurs $d\ d$, and supported by cast-iron posts A, arranged as and for the purposes herein described.

LUCIEN B. SMITH.

Witnesses:
JAS. B. DAY,
G. W. BROWN.